Aug. 20, 1929.                M. J. POPPOCK                 1,725,476
                                  SQUARE
                             Filed July 27, 1925
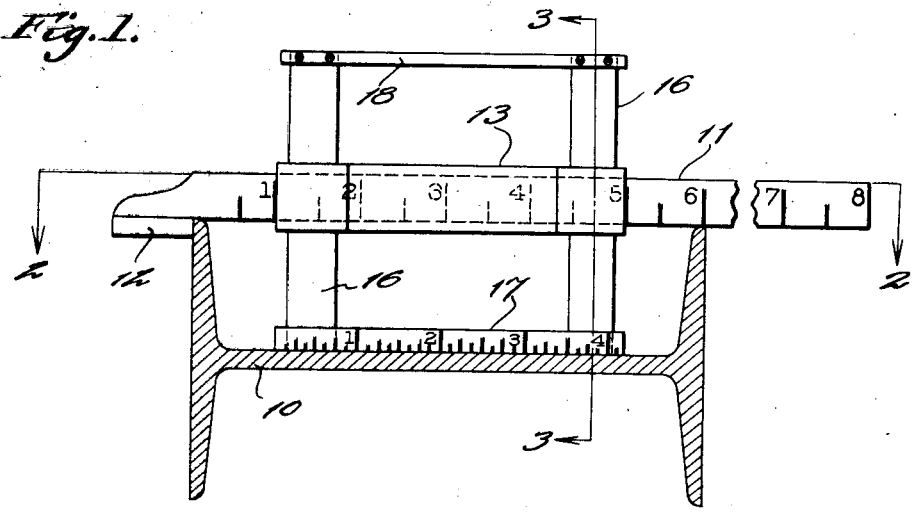
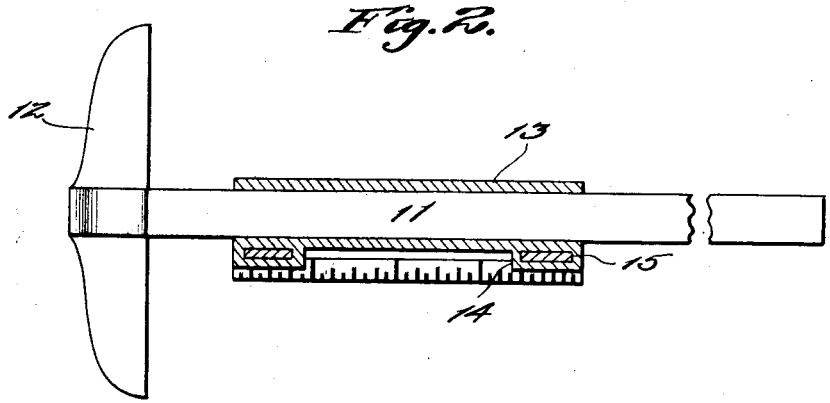
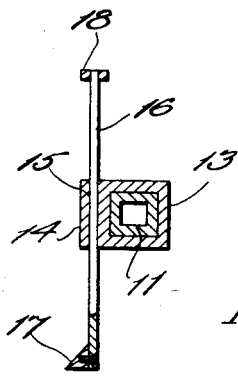
M. J. Poppock
INVENTOR
BY Victor J. Evans
ATTORNEY
WITNESS:

Patented Aug. 20, 1929.

1,725,476

UNITED STATES PATENT OFFICE.

MACK J. POPPOCK, OF MASON CITY, IOWA.

SQUARE.

Application filed July 27, 1925. Serial No. 46,435.

This invention relates to improvements in measuring devices or squares, an object being to provide means for accurately and conveniently laying off the positions of holes in H or I beams and like structural members.

Another object of the invention is the provision of a device for the above purpose which is simple in construction, accurate in use and capable of adjustment to the depths and widths of various beams.

With the above and other objects in view, the invention further includes the following novel features and details of construction, to be hereinafter more fully described, illustrated in the accompanying drawings and pointed out in the appended claims.

In the drawings:—

Figure 1 is a sectional view through a beam with the invention in position for use.

Figure 2 is a section taken substantially on the line 2—2 of Figure 1 with the beam omitted.

Figure 3 is a section on the line 3—3 of Figure 1 with the beam omitted.

Referring to the drawings in detail wherein like characters of reference denote corresponding parts, the invention is shown in connection with an H beam, indicated at 10.

The invention comprises an elongated member or blade 11 which is provided at one end with a head or stop 12, one edge of which is disposed at a true right angle with respect to the blade 11 so that a T square is provided. One face of the blade 11 is graduated to indicate inches and fractions thereof and mounted upon this blade is a slide which comprises a sleeve 13 having offset portions 14 at each end thereof, the latter being provided with slots 15. The sleeve 13 has a sliding fit upon the blade 11 and is therefore capable of longitudinal adjustment thereon.

Slidable transversely of the blade 11 and carried by the slide just described, is a frame which includes spaced parallel bars 16 having a sliding fit in the slots 15. These bar are connected at one end by an elongated member 17 which forms a part of the frame and which is graduated to indicate inches and fractions thereof. The opposite ends of the bars 16 are connected by the bar 18.

The member 17 is preferably cross sectionally triangular and the graduations are provided along its beveled face, so that when the member 17 is positioned upon the web of the beam 10, the holes to be drilled in the beam may be accurately laid off.

In the use of the invention, the device is positioned as shown in Figure 1, the slide being adjusted longitudinally upon the blade 11 while the member 17 will adjust itself to the depth of the beam. To lay out the centers for three openings to be drilled in the web, the slide is positioned at the one inch mark on the blade 11 and the first center is located at the half inch mark on the member 17. This center will thus be one and one-half inches from the edge of the beam. The second opening has its center laid off at the two inch mark on the member 17 and will thus be central of a six inch beam or three inches from either edge, while the third opening has its center laid off at the three and one-half inch mark on the member 17 and is therefore one and one-half inches from the adjacent edge of the beam.

By mounting the member 17 in the manner shown and described, it may be readily adjusted to the depth of the beams and adjusted longitudinally upon the blade 11 as required, the centers being laid off and the member 17 moved longitudinally of the blade 11 as required for beams of different sizes.

The invention is susceptible of various changes in its form, proportions and minor details of construction and the right is herein reserved to make such changes as properly fall within the scope of the appended claims.

Having described the invention what is claimed is:—

1. An instrument of the character described comprising an elongated graduated bar, spaced parallel elements each at one end connected to said bar and extending at right angles therefrom, means connecting the other ends of said elements, a frame member having transverse slots slidably receiving said parallel elements respectively, said member being formed with a slot extending longitudinally thereof so as to be parallel with said graduated bar, and a graduated T-square slidable through said second named slot.

2. An instrument of the character described comprising an elongated bar, spaced parallel elements each connected at one end to said bar, a frame member having its end portions provided with transverse slots slidably receiving said parallel elements respectively, the frame member having an additional longitudinal slot and a T-square slidably engaged in said last named slot and arranged in parallel relation to said bar.

In testimony whereof I affix my signature.

MACK J. POPPOCK.